United States Patent
Li et al.

(10) Patent No.: US 7,242,671 B2
(45) Date of Patent: Jul. 10, 2007

(54) SYSTEM AND METHOD FOR LINK-STATE BASED PROXY FLOODING OF MESSAGES IN A NETWORK

(75) Inventors: Chris Cho-Pin Li, New York, NY (US); Chang-June Yoon, Edison, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 811 days.

(21) Appl. No.: 10/316,593

(22) Filed: Dec. 11, 2002

(65) Prior Publication Data

US 2004/0174825 A1    Sep. 9, 2004

(51) Int. Cl.
 *H04L 12/28*   (2006.01)
(52) U.S. Cl. .................. 370/254; 370/400; 709/238
(58) Field of Classification Search ............... 370/218, 370/221, 238, 252, 254, 255, 351, 389, 395.2, 370/396, 400; 709/238, 223, 230
 See application file for complete search history.

(56) References Cited

U.S. PATENT DOCUMENTS

| | | | |
|---|---|---|---|
| 5,926,101 A | 7/1999 | Dasgupta | 340/825.02 |
| 6,304,556 B1 | 10/2001 | Haas | 370/254 |
| 6,349,091 B1 | 2/2002 | Li | 370/238 |
| 6,349,210 B1 | 2/2002 | Li | 455/450 |
| 6,385,174 B1 | 5/2002 | Li | 370/252 |
| 6,415,323 B1 | 7/2002 | McCanne et al. | 709/225 |
| 6,442,615 B1 | 8/2002 | Nordenstam et al. | 709/241 |
| 6,456,599 B1 | 9/2002 | Elliott | 370/254 |
| 6,683,865 B1 * | 1/2004 | Garcia-Luna-Aceves et al. | 370/349 |
| 6,810,259 B1 * | 10/2004 | Zhang | 455/456.5 |

(Continued)

FOREIGN PATENT DOCUMENTS

WO    WO 01/58237 A2    8/2001

OTHER PUBLICATIONS

"TCP/IP Tutorial and Technical Overview", IBM Redbooks, Aug. 2001, pp. 159-164.

(Continued)

*Primary Examiner*—Doris H. To
*Assistant Examiner*—Seba Tsegaye
(74) *Attorney, Agent, or Firm*—RatnerPrestia (57) ABSTRACT

The invention includes a method and apparatus for disseminating information in a communication network having a plurality of nodes. The method includes receiving, in a node, a packet including link-state advertisements (LSAs) from the communication network and a flooding status field. Based on the flooding status field, the node determines the type of LSA received and then re-floods the packet onto the communication network, based on the type of LSA determined from the flooding status field. A sub-field in the flooding status field indicates whether the LSA is intended for distribution to the entire communication network, or is intended for distribution to other nodes in the communication network located within a predetermined range of the node. The node prevents re-flooding of the LSA, if the other nodes in the communication network are located outside of the predetermined range. The node includes a re-flood timer which is set to expire based on an urgency level included in the flooding status field. The node waits for the re-flood timer to expire and then re-floods the LSA packet from the node onto the communication network.

13 Claims, 11 Drawing Sheets

U.S. PATENT DOCUMENTS

| | | | |
|---|---|---|---|
| 6,990,075 B2* | 1/2006 | Krishnamurthy et al. | ... 370/236 |
| 2003/0058804 A1* | 3/2003 | Saleh et al. | ......... 370/254 |
| 2003/0095500 A1* | 5/2003 | Cao | ............. 370/216 |
| 2005/0265260 A1* | 12/2005 | Zinin et al. | ......... 370/255 |

OTHER PUBLICATIONS

"Optimization of Routing Protocol For Packet Radio Network", C.J. Yoon et al., Tactical Communications Conference, 1996., Proceedings of the 1996 Fort Wayne, IN, USA Apr. 30-May 2, 1996, New York, NY, USA, IEEE, US, Apr. 30, 1996, pp. 479-493.

Mario Joa Ng. "Routing Protocol and Medium Access Protocol For Mobile Ad Hoc Networks", University Microfilms, Jan. 1999, pp. 1-126.

Behrens, "Distributed Routing for Very Large Networks Based on Link Vectors", University of California, Jun. 1997, pp. 1-228.

Ostap Monkewich et al., "OSPF Efficient LSA Refreshment Function in SDL", Springer-Verlag Berlin Heidelberg, 2001, pp. 300-315.

Mario Gerla et al., "Landmark Routing for Large Ad Hoc Wireless Networks", IEEE, 2000, pp. 1702-1706.

Brad Cain, "Fast Link State Flooding", IEEE, 2000, pp. 465-469.

Oran Sharon et al., "Dissemination of Routing Information in a Broadcast Networks: OSPF versus IS-IS" IEEE Network, Jan./Feb. 2001, pp. 56-65.

Guangyu Pei et al., "LANMAR: Landmark Routing for Large Scale Wireless Ad Hoc Networks with Group Mobility", IEEE, 2000, pp. 11-18.

Guangyu Pei et al., "Fisheye State Routing: A Routing Scheme for Ad Hoc Wireless Networks", IEEE, 2000, pp. 70-74.

N. Schult et al., "Routing in Mobile Ad Hoc Networks", IEEE, 1999, pp. 10-14.

Paolo Narvaez et al., "Local Restoration Algorithm for Link-State Routing Protocol", IEEE, 1999, pp. 352-357.

Marc Pearlman et al., "Determining the Optimal Configuration for the Zone Routing Protocol", IEEE, 1999, pp. 1395-1414.

Yih Huang et al., "Optimal Switch-Aided Flooding Operations in ATM Networks", IEEE, 1998, pp. 329-338.

Charles E. Perkins et al., "Highly Dynamic Destination-Sequenced Distance-Vector Routing (DSDV) for Mobile Computer", SIGCOMM, 1994, pp. 234-244.

Atsushi Iwata et al., "Scalable Routing Strategies for Ad Hoc Wireless Networks", IEEE, 1999, pp. 1369-1379.

David B. Johnson et al., "Dynamic Source Routing in Ad Hoc Wireless Networks", Kluwer Academic Publishers, 1996, pp. 1-18.

Charles Perkins, "Ad Hoc On Demand Distance Vector (AODV) Routing draft-ietf-manet-aodv-00.txt", Sun Microsystems, Nov. 20, 1997, pp. 1-12.

J. Moy, "OSPF Version 2", RFC-1247, Jul. 1991.

Chris Li et al., "SUO SAS Radio Intra-Networking Architecture" ITT Industries, pp. 1-5.

* cited by examiner

LSA Status Field

FIG. 2

LSA Status Field (S = GLOBAL)

FIG. 3

LSA Status Field (S = LOCAL)

SYSTEM AND METHOD FOR LINK-STATE BASED PROXY FLOODING OF MESSAGES IN A NETWORK

FIELD OF THE INVENTION

This invention relates, in general, to systems communicating in a network and, more particularly, to a system and method employing link-state based routing of messages in the network with reduced amount of flooding overhead.

BACKGROUND OF THE INVENTION

In general, wireless networks, such as cellular telephone systems, may be arranged in a two-tier architecture. The first tier typically includes clusters or cells, each including communication nodes or cluster members. One node within each cluster is designated a cluster head or base station. The second tier includes a backbone network formed of the cluster head nodes to enable communications between different clusters. The formation of clusters and designation of cluster head nodes is generally performed dynamically and in accordance with an intranet protocol (e.g., a protocol for communications within the two-tier network) that further performs routing functions within the network. The intranet protocol may be a link-state type of routing protocol that is implemented on the backbone network. The cluster head nodes each include a database that is synchronized with other head node databases by transference of link-state advertisement (LSA) packets in accordance with the protocol. These databases include information enabling the cluster head nodes to determine appropriate paths for routing messages thorough the network, while the LSA packets provide information to update the databases.

For routing in mobile ad hoc networks, general purpose routing schemes, such as distance-vector (DV) and link-state (LS), distribute routing information to communication peers within the network. The amount of flooding overhead for the dissemination of routing information by these routing approaches is generally influenced by two key factors, namely, network size and volatility of network connectivity. The amount of flooding overhead usually increases, when the network size increases and/or the underlying network becomes more volatile.

To reliably disseminate routing information, conventional DV and LS protocols deploy a two-way exchange scheme. When a communication node running the DV or LS protocol needs to distribute a piece of routing information to its routing neighbor(s), it sends a point-to-point packet to the neighbor. Upon reception of the routing packet, the routing neighbor returns an acknowledgment packet back to the sender of the routing packet. When it has two or more routing neighbors, instead of sending separate point-to-point routing packets to each routing neighbor, the communication node sends one broadcast routing packet to all the routing neighbors, which return point-to-point acknowledgment packets back to the communication no made after the routing packet is received.

The amount of flooding overhead, generally, increases exponentially faster than the increase of network size. In fact, the amount of flooding overhead generated by these conventional approaches is manageable only for small scale networks (<30 communication nodes). For large scale networks, the amount of flooding overhead tends to overwhelm the network and result in network communication breakdown. In addition, volatile network connectivity tends to introduce more changes in network link metrics, which in turn causes more routing information to be distributed in the network.

U.S. Pat. No. 6,385,174, issued to one of the inventors of the present invention, on May 7, 2002, discloses a method of transmitting LSA packets or messages within a wireless communication system. The method utilizes a version of an open shortest path first (OSPF) routing protocol or a radio open shortest path first (ROSP) routing protocol. This patent is incorporated herein by reference in its entirety.

As described in the patent, ROSPF LSA type packets are transmitted to neighbors of each node to enable each database to maintain current information. In order to reduce overhead of transmitting numerous LSA type packets, ROSPF LSA type packets are transmitted within an intranet protocol that is periodically broadcasted within the network. In this manner, the increase in overhead flooding rate is reduced.

Although the flooding overhead is reduced using the system described in the patent, nevertheless, as the number of nodes increases in a network, the amount of flooding overhead increases exponentially. Because the amount of flooding overhead generated by conventional flooding approaches increases exponentially faster than the underlying network size, traditional approaches are only workable in smaller scale networks, with relative stable network connectivity. For larger scale and/or more volatile networks, conventional approaches tend to generate too much flooding overhead that shuts down communication in the underlying network.

What is needed is a system and method that disseminates routing information that further eliminates redundant flooding of information. The present invention addresses this need.

SUMMARY OF THE INVENTION

To meet this and other needs, and in view of its purposes, the present invention provides a method of disseminating information in a communication network having a plurality of nodes. The method includes the steps of (a) receiving, in a node, a packet including link-state advertisements (LSAs) from the communication network, where at least one LSA includes a flooding status field; (b) determining, in the node, a type of LSA received based on the flooding status field; and (c) re-flooding the packet, from the node, onto the communication network, based on the type of LSA determined in step (b).

Step (a) of the invention also includes receiving a bit in the flooding status field indicating the at least one LSA is intended for distribution to the entire communication network. Step (c) of the invention also includes re-flooding, from the node, the at least one LSA onto the communication network in response to the bit in the flooding status field. Step (a) further includes receiving a bit in the flooding status field indicating the at least one LSA is intended for distribution to other nodes in the communication network located within a predetermined range of the node. Step (c) further includes preventing re-flooding of the at least one LSA, from; the node, if the other nodes in the communication network are located outside of the predetermined range.

Step (a) of the invention still further includes receiving a sub-field in the flooding status field indicating a time-to-live (TTL) value. Step (c) of the invention still further includes re-flooding the at least one LSA, from the node, onto the communication network, if the received TTL value is greater than a value of one, and preventing re-flooding of the at least one LSA if the received TTL value is equal to a value of zero.

In another embodiment of the invention, the node includes a re-flood timer and the method includes waiting an interval of time for the re-flood timer to expire. The method re-floods the packet, from the node, onto the communication network, after waiting the interval of time for the re-flood timer to expire.

The method further includes receiving a sub-field in the flooding status field that indicates an urgency level for the at least one LSA. The method sets the re-flood timer to expire based on the indicated urgency level. The method then waits for the re-flood timer to expire and then re-floods the packet from the node onto the communication network.

In another embodiment, the invention includes a method of disseminating information in a communication network having a plurality of clusters, a cluster having a flooding proxy node and at least one flooding group member node. The method includes the steps of (a) receiving, in a flooding proxy node of a first cluster, a packet from a sender node in the communication network; (b) determining, in the flooding proxy node, if the sender node is one of (i) a flooding group member node of the first cluster and (ii) a flooding proxy node of a second cluster in the communication network; and (c) re-flooding the packet, from the flooding proxy node, onto the communication network if step (b) determines that the sender node is either the flooding group member node of the first cluster or the flooding proxy node of the second cluster.

In the other embodiment of the invention, the method prevents, in the flooding proxy node, re-flooding of the packet if step (b) determines that the sender node is not the flooding group member node of the first cluster and not the flooding proxy node of the second cluster. The method also determines, in a flooding proxy node, a number for expected receivers of the packet. The method then re-floods the packet, from the flooding proxy node, onto the communication network, by broadcasting the packet onto the communication network, if the number determined is larger than a predetermined integer value. The method also re-floods the packet, from the flooding proxy node, onto the communication network, by point-to-point communication to each of the expected receivers of the packet, if the number determined is smaller than or equal to the predetermined integer Value.

In yet another embodiment, the invention includes a node disseminating information by transmitting link state advertisements (LSAs) to other nodes in a network. The node includes a transmitter for transmitting LSAs to other nodes in the network, and a processor for assembling at least one LSA and providing the LSA to the transmitter for transmission onto the network. The processor includes an engine for generating a flooding status field in the at least one LSA.

The flooding status field, in accordance with the invention, includes a flooding scope flag indicating the at least one LSA is intended for distribution to either (a) other nodes in the entire network or (b) other nodes located within a predetermined range of the node. The flooding status field also includes a sub-field indicating a time-to-live (TTL) value. If the TTL value is greater than a value of one, the process of provides the LSA to the transmitter for transmission onto the network. If the TTL value is less than or equal to a value of one, the processor prevents the LSA from being provided to the transmitter for transmission onto the network.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The present invention disseminates routing information over a two-tier flooding architecture. With this flooding architecture, redundant flooding (or re-flooding) of routing information is greatly reduced. As will be described, the present invention includes a method for transmitting and acknowledging received messages, which dramatically reduces the amount of overhead required to ensure reliable information dissemination in the network.

In general, the amount of flooding overhead generated by this invention is linearly proportional (and not exponentially proportional) to the increase of the underlying network size. As a result, when the network size increases, the amount of flooding overhead utilized by this invention increases at a much lower rate than conventional approaches. Since this invention is advantageously capable of flooding information reliably with much smaller overhead than conventional approaches, it may be used in networks that are much larger than conventional networks.

Figure 1:
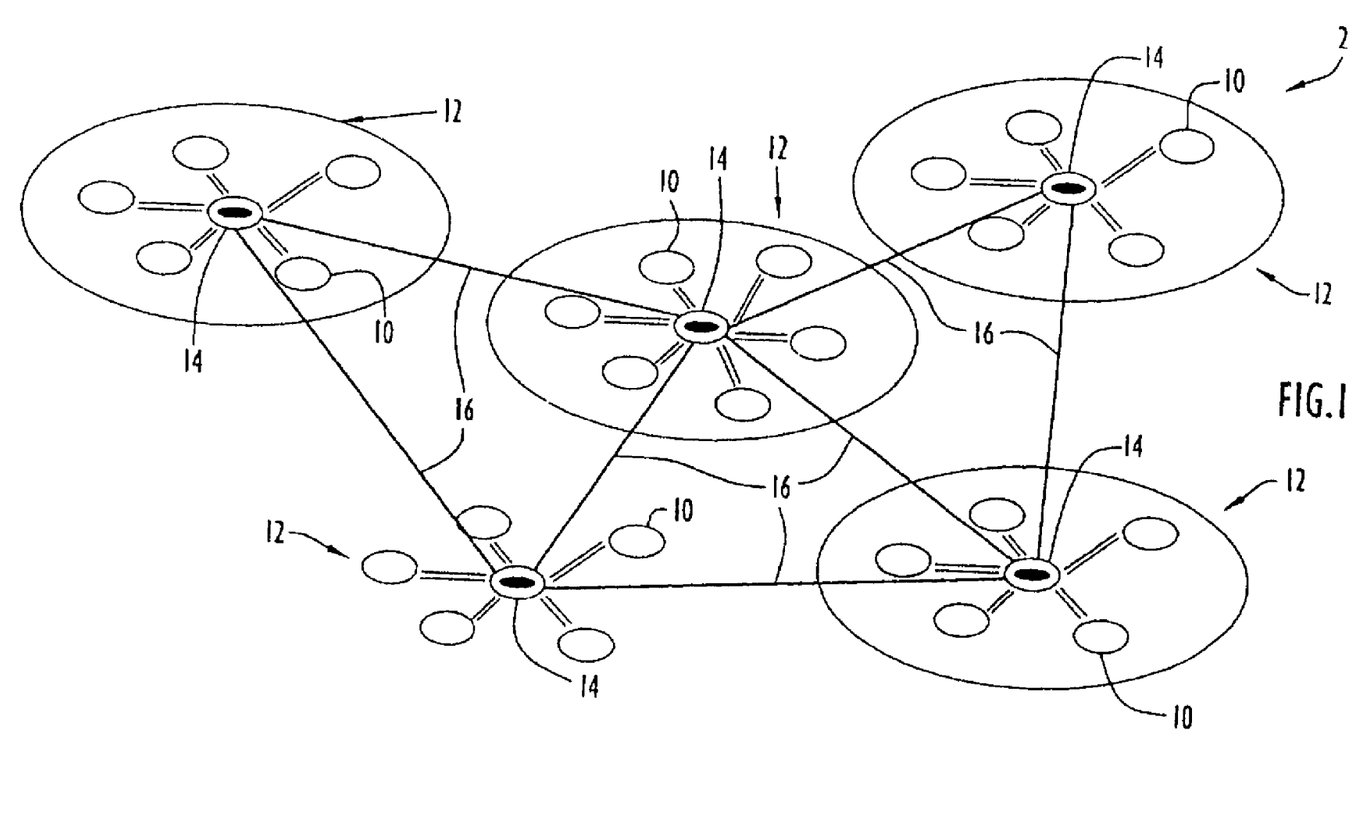
FIG. 1 is a diagrammatic illustration of network nodes arranged in an exemplary communication network.

Network nodes, according to the present invention, arranged in an exemplary two-tier wireless network are illustrated in FIG. 1. Specifically, wireless network 2 includes a plurality of nodes 10 arranged in cells or clusters 12. Each cell or cluster includes corresponding cluster member nodes 10, with one of the cluster member nodes designated as a cluster head node, or base station 14. These cluster arrangements form the first tier of network 2 and facilitate communication within a cluster between the cluster head and member nodes, preferably utilizing a first transmission frequency. The head nodes of each cluster are in communication with each other, preferably utilizing a second transmission frequency, and form backbone network 16. The backbone network forms the second tier of network 2 and facilitates communications between nodes of different clusters (generally providing communications over greater distances).

The architecture of network 2 employs a two-tier flooding architecture for information dissemination. Each cell or cluster 12 is grouped into a different flooding group (FG). Within each FG (designated as 12), a node, designated as 14, having connections to all the other member nodes within FG. 12, is selected as a flooding proxy (FP). The nodes connected to a FP are referred to herein as FG members (FGM) connected to a FP in tier-1. The FPs linked by backbone network 16 are also referred to as FPs linked by main flooding paths (MFPs) 16 in tier-2.

When disseminating LSAs in, the network, a FGM first sends an LSA packet to its FP via point-to-point transmission and the FP, in turn, floods the packet over the MFPs via broadcast transmission. As the LSA packet propagates across the MFP through broadcast transmissions, all FGMs affiliated with the broadcasting FP, and the FP's FP neighbors may be able to receive the packet. With the deployment of broadcast flooding on the MFP, explicit point-to-point acknowledgements (ACKs) are generally not required, because continued broadcasts may also serve as implied ACKs for the received LSA packets.

As will be explained, the present invention uses a link-state proxy flooding protocol (LSPFP) which efficiently disseminates LSAs over a large scale network, using the two-tier flooding architecture described with respect to FIG. 1. In general, the LSPFP protocol may be implemented by two functional groups, namely, flooding group member (FGM) based functions, and flooding proxy (FP) based functions. As their names imply, the execution of these functions is dependent on the role (FGM or FP) of the respective node.

In link-state (LS) routing, not all LSAs created by the LS routing engine are equal. Thus, some LSAs may be flooded rapidly, while other LSAs may be flooded at a slower pace. Also, some LSAs may be required to be flooded reliably and some may only need to be flooded within a predefined distance away from the originator node of the LSAs. As a result, different flooding services may be used which incur different flooding overhead.

Flooding services, supported by this invention, vary according to the needs of the users (LS routing engine of a node) and may include the following:

(a) Reliable Global Flooding (RGF). This flooding service disseminates LSAs reliably throughout the network. This flooding service incurs the highest flooding overhead.

(b) Normal Global Flooding (NGF). This flooding service disseminates LSAs throughout the network. Reliability is not guaranteed by this flooding service. The flooding overhead incurred by this flooding service is less than RGF.

(c) Reliable Local Flooding (RLF). This flooding service disseminates LSAs reliably within a predefined flooding range. This flooding service incurs less flooding overhead than RGF.

(d) Normal Local Flooding. This flooding service disseminates LSAs within a predefined flooding range. Reliability is not guaranteed by this flooding service. This flooding service incurs less flooding overhead than RLF.

Figure 2:
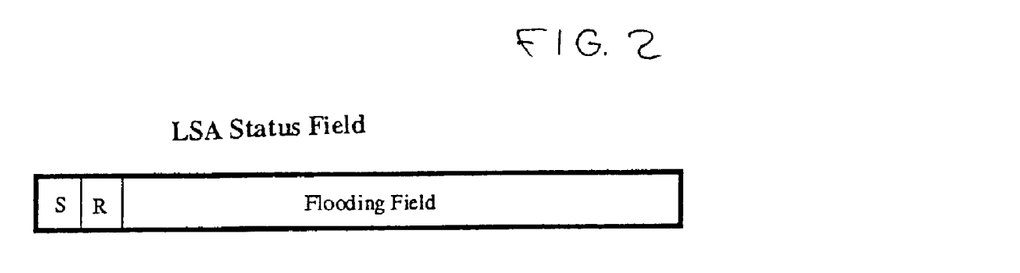
FIGS. 2–4 illustrate different link-state advertisement (LSA) status fields provided by nodes shown in FIG. 1 when communicating LSA packets, in accordance with the present invention.

A link-state routing engine may first select a flooding service and then pass the LSA to the LSPFP for flooding. The present invention employs a LSA status field attached to each LSA. The LSA status field is shown in FIG. 2. The S and R sub-fields in FIG. 2 represent a LSA flooding scope flag (FSF) and a flooding reliability flag (FRF), respectively. The FSF and FRF are set and used as explained below.

The FSF, S has a value of either GLOBAL or LOCAL, and indicates the intended flooding scope for the associated LSA. The LSA is flooded to the entire network if S is set to GLOBAL. S is set to GLOBAL for the RGF and NGF flooding services. On the other hand, when the LSA is set to LOCAL, the LSA is distributed to the communication nodes located within a predefined distance from the LSA originator node. S is set to LOCAL for RLF and NLF flooding services.

Figure 3:
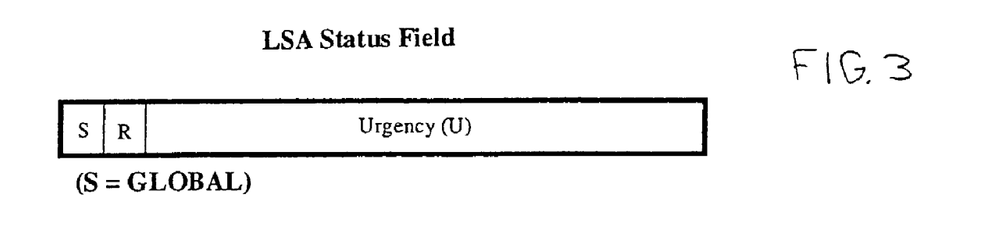
Figure 4:
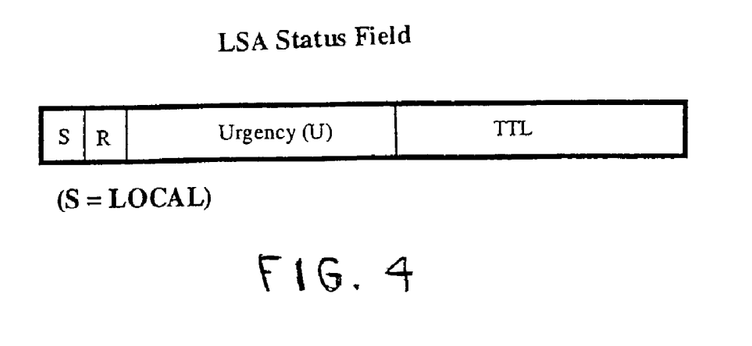

FIGS. 3 and 4 show formats of the LSA status field for S=GLOBAL and S=LOCAL, respectively. As depicted in FIGS. 3 and 4, both formats contain an urgency (U) sub-field. In the LSPFP protocol, the U sub-field is used to control the flooding pace of the associated LSA. In general, U=[0, 1, 2, ... Umax] and a higher U value indicates a more urgent LSA.

The LSA status field for S=LOCAL contains an extra TTL (Time-To-Live) sub-field to support local flooding service. In the LSPFP protocol, the TTL sub-field specifies the number of hops the LSA may travel before flooding is stopped. In other words, the TTL sub-field indicates a radius of the flooding range for the local flooding service.

The FRF, R has a value of either NORMAL or RELIABLE, and indicates whether reliability is required for the dissemination of the associated LSA. When R is set to RELIABLE, the LSA is flooded reliably. On the other hand, reliability is not guaranteed, if R is set to NORMAL. R is set to RELIABLE for RGF and RLF flooding services and set to NORMAL for NGF and NLF flooding services.

As will be described, in embodiments of the invention, the LSPFP utilizes four types of protocol timers to control the pace of LSA flooding and support the various flooding services. These LSPFP protocol timers are as follows:

(a) ACK Timers. The ACK timers ($T_{ACK,U}$) are indexed by the urgency (U) sub-field in the associated LSA status field (see FIGS. 3 and 4). The ACK timers are set for transmissions of acknowledgment (ACK) messages to the associated communication nodes. When an ACK timer expires, an ACK message is sent to the associated node. The ACK timers are maintained in the FGMs, and $T_{ACK,0} > T_{ACK,1} > T_{ACK,2} > \ldots > T_{ACK,Umax}$.

(b) ACK Timeout Timers. The ACK timeout timers ($T'_{ACK,U}$) are indexed by the urgency (U) sub-field in the associated LSA status field (see FIGS. 3 and 4). The ACK timeout timers are set for the reception of an expected ACK message. An expired ACK timeout timer indicates an event of failing to receive an expected ACK message. The ACK timeout timers are maintained in the FPs, and $T'_{ACK,0} > T'_{ACK,1} > T'_{ACK,2} > \ldots > T'_{ACK,Umax}$.

(c) Re-Flood Timers. The re-flood timers ($T_{re\text{-}flood,U}$) are indexed by the urgency (U) sub-field in the associated LSA status field (see FIGS. 3 and 4). The re-flood timers are set to schedule a flooding of associated LSAs. When a re-flood timer expires, LSAs are flooded to the next hop. The re-flood timers are maintained in the FPs and FGMs, and $T_{re-flood,0} > T_{re-flood,1} > T_{re-flood,2} > \ldots > T_{re-flood,Umax}$.

(d) Re-Flood Timeout Timers. The re-flood timeout timers ($T'_{re-flood,U}$) are indexed by the urgency (U) sub-field in the associated LSA status field (see FIGS. 3 and 4). The re-flood timeout timers are set for the reception of an expected LSA. An expired re-flood timeout timer indicates the event of failing to receive an expected LSA. The re-flood timeout timers are maintained in the FPs and FGMs, and $T'_{re-flood,0} > T'_{re-flood,1} > T'_{re-flood,2} > \ldots > T'_{re-flood,umax}$.

For optimum performance, the intervals of the LSPFP protocol timers may be set to satisfy the following relationships:

$T_{ACK,U} > T_{ACK,U}$
$T_{re-flood,U} > T_{re-flood,U}$
$T_{ACK,U} > T_{re-flood,U}$
$T_{re-flood,U} > T_{ACK,U}$, and
$T_{ACK,U} > T'_{re-flood,U}$ for a given urgency level U.

These timer parameters may be tuned and adjusted to meet network performance requirements.

To avoid synchronization of timers in the network, the intervals of the LSPFP timers may be constructed using the following relationship:

Time=Fixed+random(Offset)

where the fixed portion of the timer interval is configurable, and the random portion is a uniform distribution function (0, Offset).

Having described the various flooding services and the various protocol timers, methods of the invention, executed by FGMs and FPs in a network, will now be described by reference to FIGS. 5–12. It will be appreciated that FIGS. 5–6 and 9 depict methods executed by a FGM, and FIGS. 7–12 depict methods executed by a FP.

Figure 5:
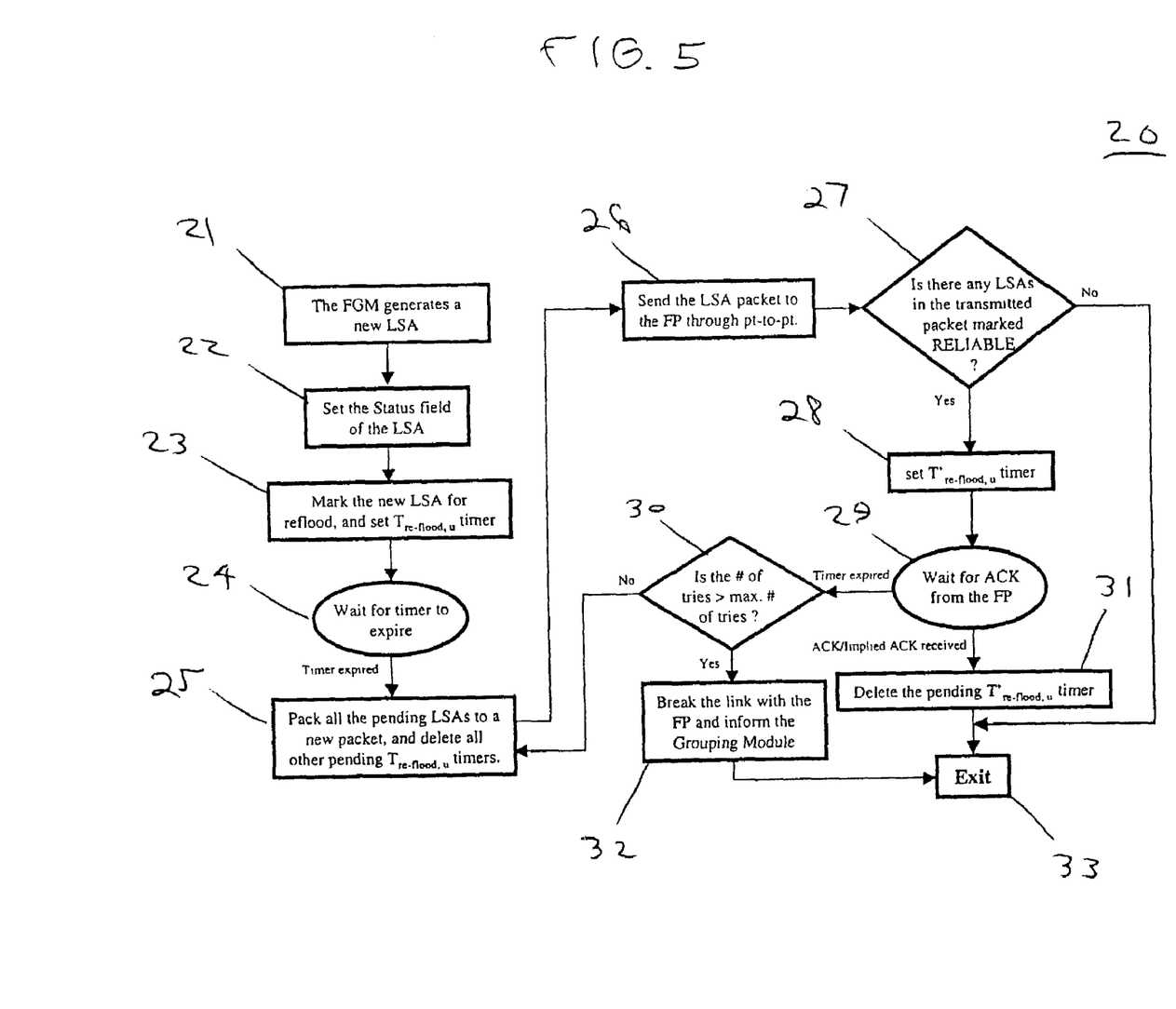
FIG. 5 is a procedural flow chart illustrating a method in which a flooding group member (FGM) of a network transmits a FGM originated LSA packet into the network, according to an embodiment of the invention.
Figure 6:
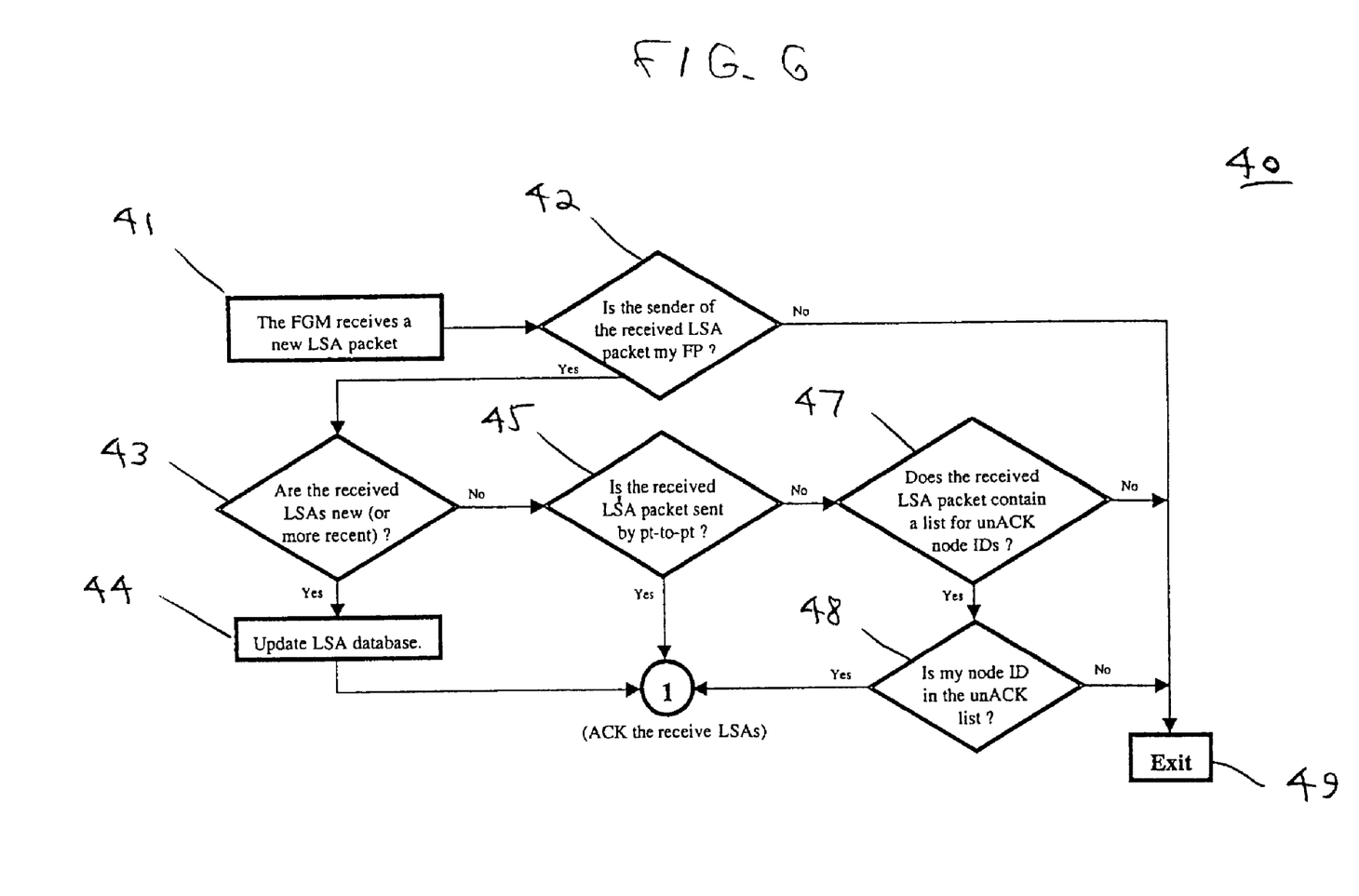
FIG. 6 is a procedural flow chart illustrating a method in which a flooding group member (FGM) of a network receives a LSA packet from a flooding proxy (FP) of the network, according to an embodiment of the invention.

Referring now to FIG. 5, there is shown a method of the invention, generally designated as 20, for injecting FGM originated LSAs into the network. Method 20 is executed when a new LSA is received from a routing engine of the FGM for further dissemination. As shown, a new LSA is generated by the FGM (for example, node 10 in FIG. 1) in step 21. The method sets the status field of the LSA (step 22), marks the new LSA for re-flood and sets a $T_{re-flood,U}$ timer, which indicates the level of urgency of the LSA (step 23).

The method waits for the re-flood timer to expire (step 24). After the timer expires, the method enters step 25 and packs all pending LSAs into a new packet, while also deleting all other pending re-flood timers. The LSA packet is transmitted to the FP (for example, node 14 in FIG. 1), using point-to-point communication (step 26). The method then enters decision box 27 and determines whether any of the transmitted LSAs are marked RELIABLE. If none of the LSAs are marked RELIABLE, the method branches to step 33 and exits. If a LSA that is marked RELIABLE has been transmitted, however, the method branches to step 28 and sets the re-flood timeout timer (indexed by the urgency level).

The method then waits for ax acknowledgement to be received from the FP (node 14) in step 29. If an acknowledgement is received, or an implied acknowledgement is received, the method deletes the pending re-flood timeout timer (step 31) and exits (step 33).

If the re-flood timeout timer expires without receiving an acknowledgment, however, the method enters decision box 30. The method decides whether to again transmit the LSA packet (i.e. re-flood). If the number of re-flood attempts are greater than a predetermined number (for example 5), the method branches to step 32 and breaks communication with the FP. The method also informs its grouping module that transmissions of LSAs to the FP have failed, and exits in step 33. If the number of re-flood attempts do not exceed the predetermined number, the method branches back to step 25 and re-floods the LSA packet.

Referring next to FIG. 6, there is shown a method of the invention, generally designated as 40, for reception of LSAs from a FP. Method 40 is executed when a new LSA is received by a FGM (own FGM). As shown, the method, executed in the own FGM, receives a new LSA packet (step 41). The method then enters decision box 42 and determines whether the LSA is sent from a FP belonging in the same flooding group (for example 12 in FIG. 1) of this own FGM. If the received LSA packet is not from its own FP, the method branches to step 49 and exits. If the received LSA packet is from its own FP, however, the method branches to decision box 43, and determines whether the received LSA is new, or more recent. If it is new, or more recent, the method enters step 44, updates the LSA database, and acknowledges the received LSA (entry point 1, see FIG. 9).

If the received LSA packet is sent point-to-point, as determined in decision box 45, the received LSA is acknowledged (see FIG. 9). If the received LSA is not sent point-to-point (e.g. broadcast), however, the method enters decision box 47 and determines whether the received LSA contains a list identifying nodes that have not acknowledged. If no list is included in the packet, the method exits in step 49. If a list is included, however, the method enters decision box 48 and determines if own FGM is identified in the list. If own FGM is, in fact, identified in the list, the method branches to entry point 1 and acknowledges the received LSA (see FIG. 9).

Figure 7:
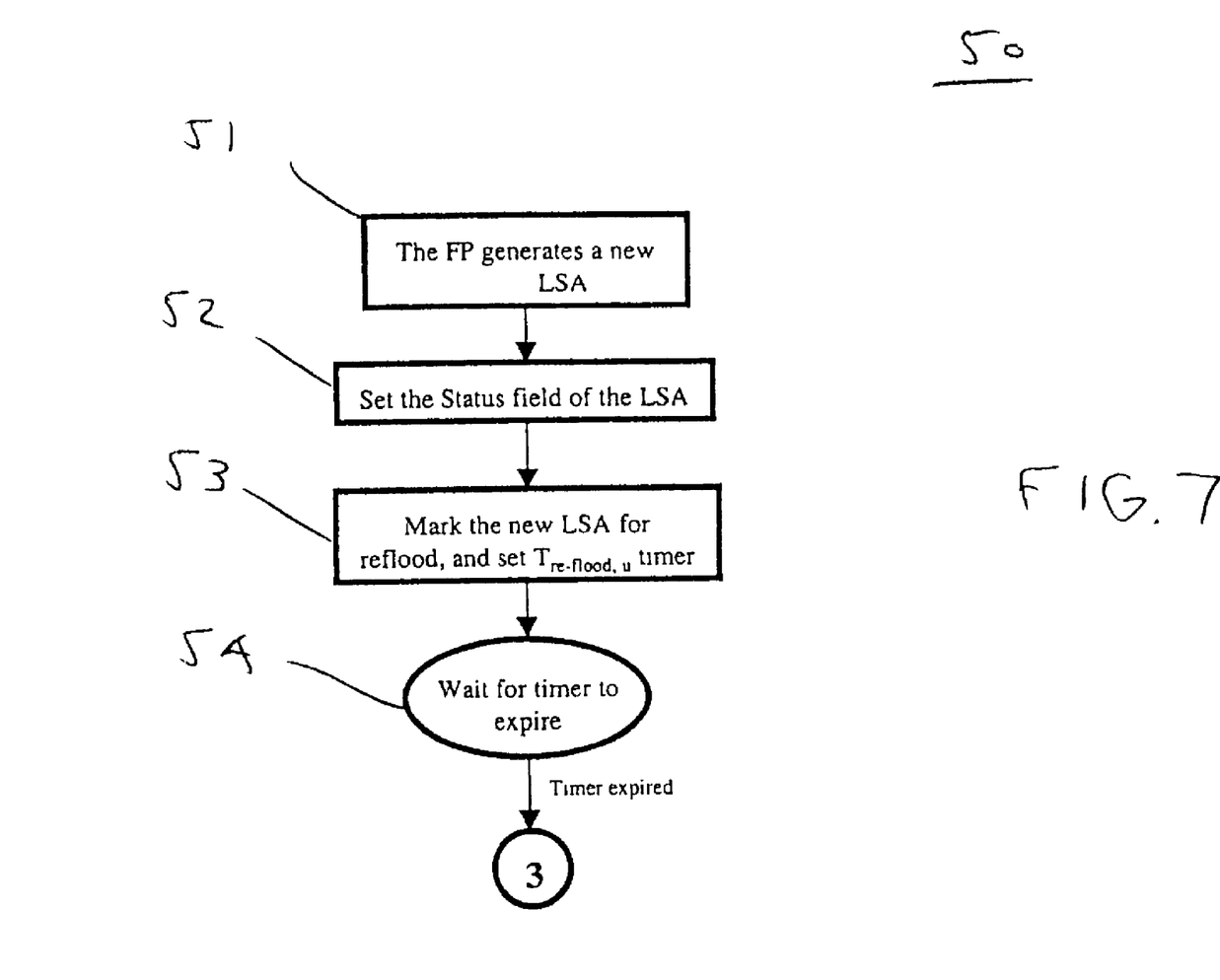
FIG. 7 is a procedural flow chart illustrating a method in which a FP of a network transmits a FP originated LSA packet into the network, according to an embodiment of the invention.

Referring now to FIG. 7, there is shown a method of the invention, generally designated as 50, for a FP injecting (transmitting) a new LSA into the network. The new LSA injected into the network is assumed to originate in the FP (own FP). As shown, the method, executed in the own FP, generates a new LSA in step 51. The status field of the LSA is set in step 52. The LSA is marked for re-flood, and the re-flood timer (with the appropriate urgency level) is set in step 53. (It will be appreciated that re-flooding, as used in step 53, is flooding which occurs for the first time.)

Figure 11:
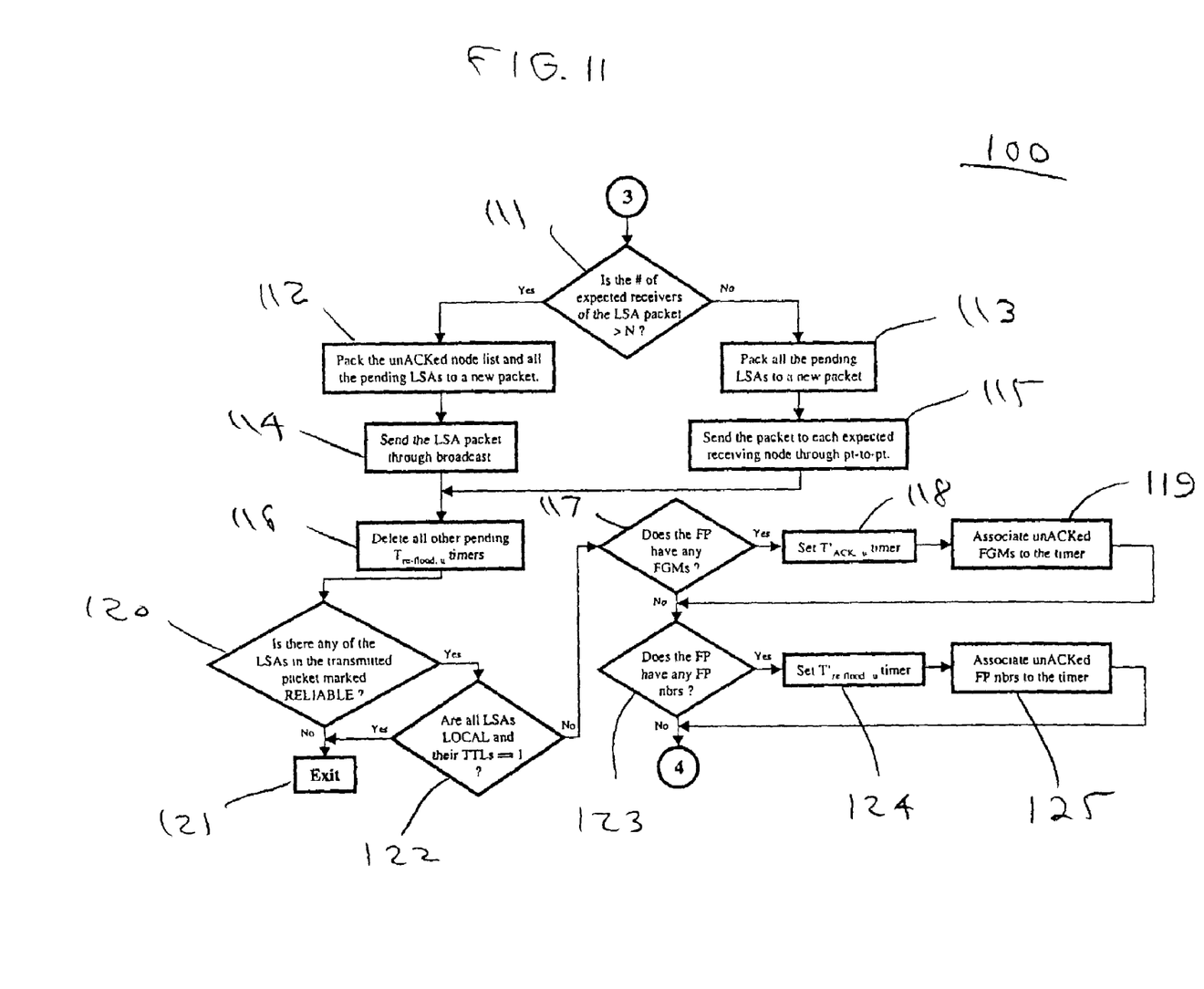

After the timer expires in step 54, the method performs various steps identified in FIG. 11 (entry point 3). These steps include transmitting (or flooding) the LSA packet by broadcast or by point-to-point (unicast) communication. These steps are described later with respect to FIG. 11.

Figure 8:
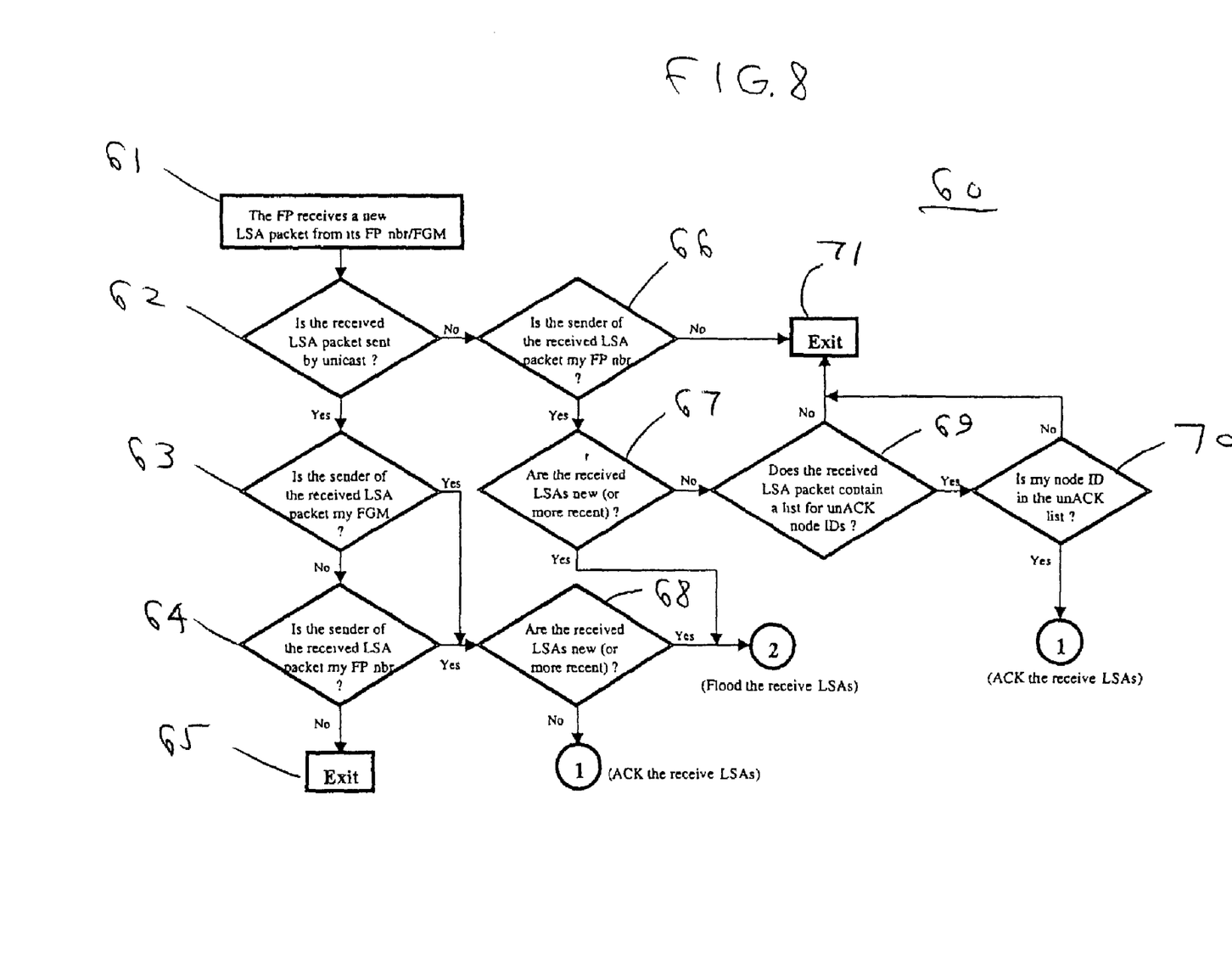
FIG. 8 is a procedural flow chart illustrating a method in which a FP of a network receives a LSA packet from a neighbor FP or its own FGM in the network, according to an embodiment of the invention.
Figure 9:
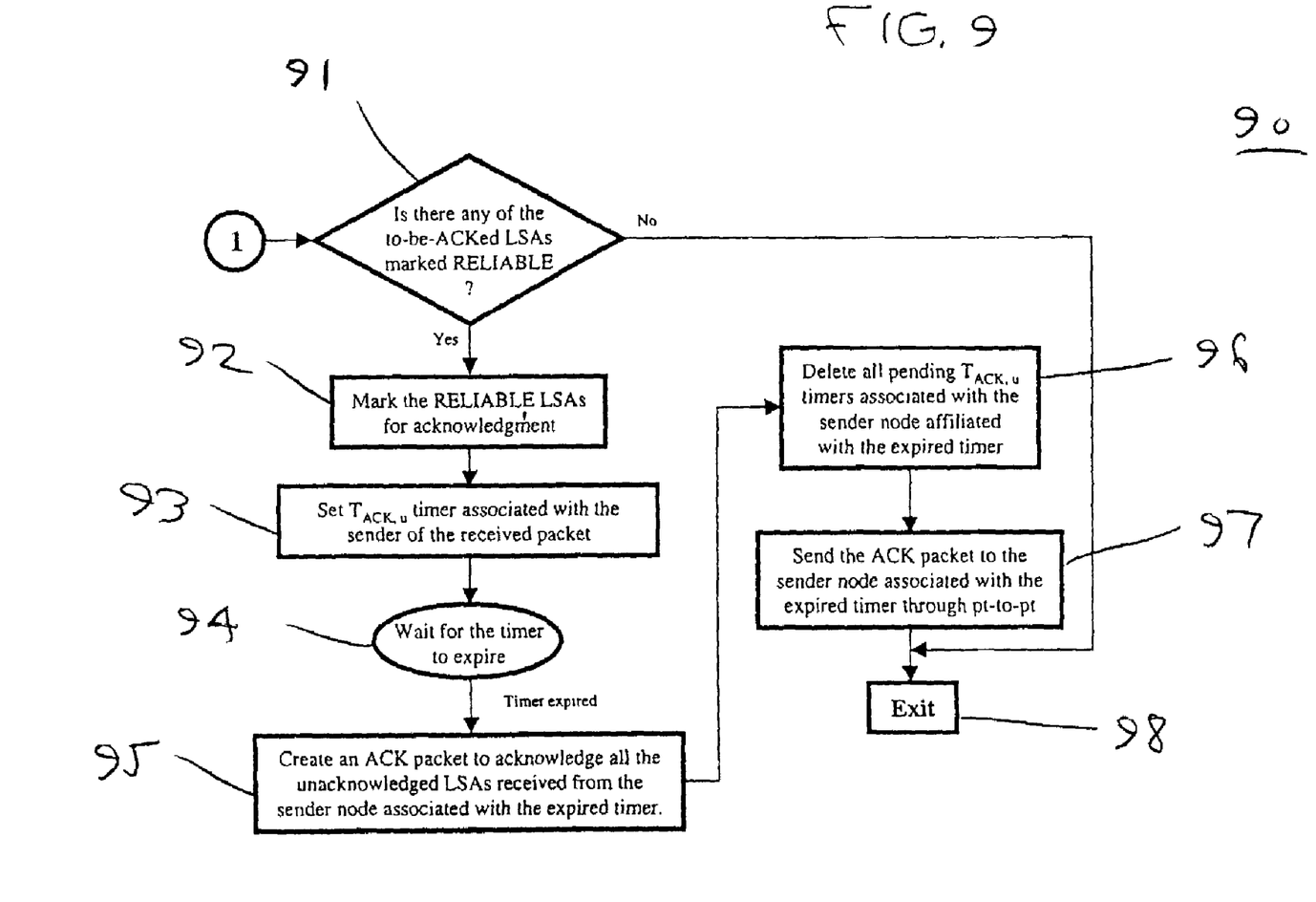
FIG. 9 is a procedural flow chart illustrating a method in which a FP or a FGM of a network acknowledges a received LSA packet, according to an embodiment of the invention.

Referring now to FIG. 8, there is shown a method of the invention, generally designated as 60, for a FP (own FP) receiving a LSA packet from a FGM or another (neighbor) FP. As shown, the method executed by the own FP receives a new LSA packet from its neighbor FP or from its own FGM (step 61). If the received LSA packet is not sent by unicast (point-to-point) and the sender is not a FP neighbor (as determined by decision boxes 62 and 66), the method enters step 71 and exits.

Figure 10:
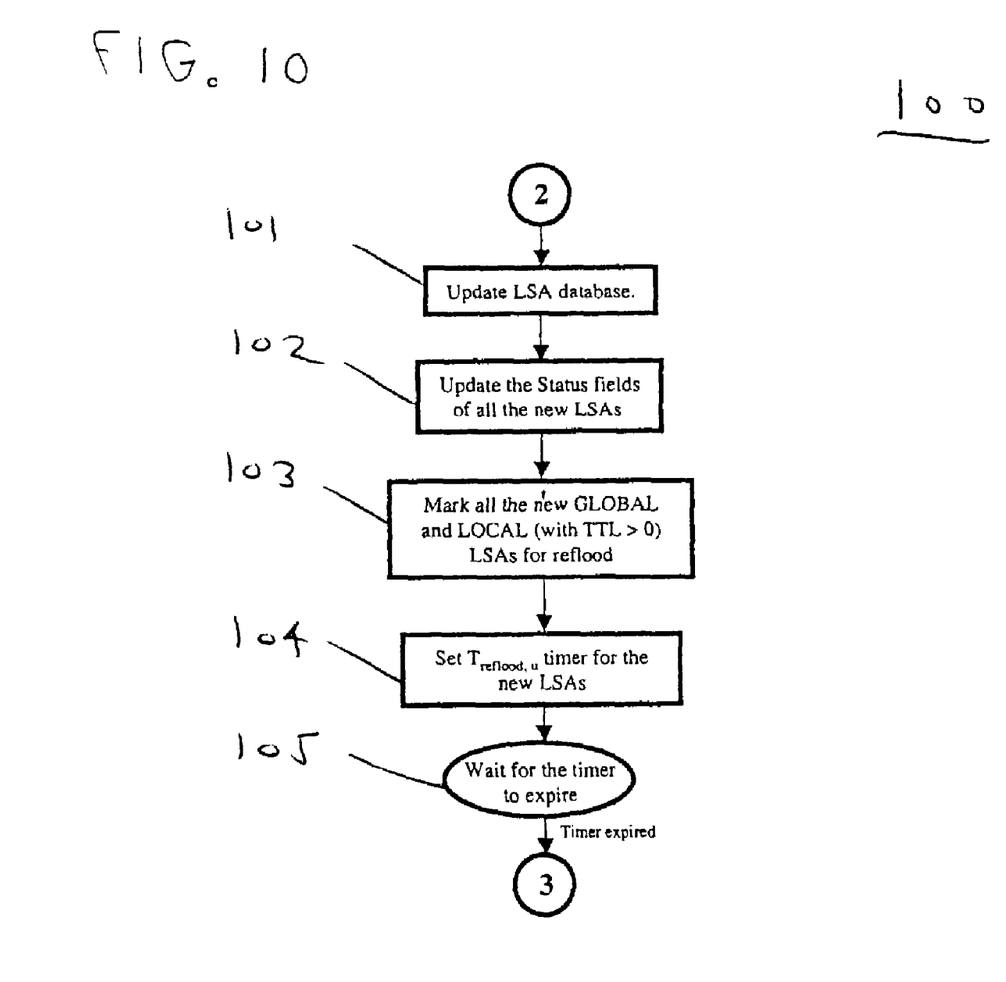
FIGS. 10–12 are procedural flow charts illustrating a method in which a FP of a network floods, or transmits, a LSA packet into the network, according to an embodiment of the invention.

If the received LSA packet, however, is sent by unicast, and the sender is its own FGM, and the received LSA packet is new (or more recent), as determined by decision boxes 62, 63 and 68, the method floods the received LSA packet (entry point 2 of FIG. 10).

If the received LSA packets, on the other hand, is sent by unicast, and the sender is its own FGM, and the received LSA packet is not new, as determined by decision boxes 62, 63 and 68, the method does not flood the received LSA packet. The method only acknowledges the received LSA (entry point 1 of FIG. 9).

It will be appreciated that if the received LSA packet is sent by unicast, and the sender is not its FP neighbor, nor its own FGM, as determined by decision boxes 62, 63 and 64, the method exits in step 65.

If the received LSA packet is not sent by unicast, and the sender is its FP neighbor, and the received LSA packet is not new, as determined by decision boxes 62, 66 and 67, the method determines whether the received LSA packet contains a list of node IDs that have not acknowledged (decision box 69). If the list does not include own ID, as determined by decision box 70, the method exits in step 71. If the list does include own ID, however, the method branches to entry point 1 and acknowledges the received LSA (FIG. 9).

Turning next to FIG. 9, a method of acknowledging a received LSA packet, generally designated as 90, is illustrated. Method 90 may be executed by a FP or a FGM. Starting at entry point 1, decision box 91 determines whether the received LSA is marked RELIABLE. If it is not (e.g. marked NORMAL), the method exits in step 98.

If the method determines that the received LSA is marked RELIABLE, step 92 is entered and the received LSA is marked for acknowledgement. The acknowledge timer (with the appropriate urgency level) is set in step 93. The method waits for the timer to expire (step 94) and then forms an acknowledge packet to acknowledge the received LSA (and other unacknowledged LSAs received from the sender node) (step 95). All pending acknowledge timers are deleted (step 96) and the acknowledge packet is transmitted to the sender, via point-to-point communication (step 97). The method for acknowledging ends at step 98.

Turning now to FIG. 10, there is shown method 100 for flooding a received LSA, in accordance with an embodiment of the invention. The method first updates the LSA database (step 101) and then updates the status fields of all the new LSAs (step 102). The new LSAs (either having a status field of GLOBAL or LOCAL (with TTL>0)) are marked for re-flood (step 103). The re-flood times with an appropriate urgency level is set for every LSA (step 104). The method waits for the timer to expire (step 105) and, upon expiration, enters point 3 of FIG. 11.

Referring now to FIG. 11, method 100 continues by entering decision box 111. If the number of expected receivers of the LSA packet is less than a predetermined number N (for example 32), the method branches to step 113 and packs all pending LSAs into a new packet. The new packet is sent by point-to-point communication to each expected receiving node (step 115). The method then branches to step 116.

If the number of expected receivers of the LSA packet is greater than N, however, the method branches from decision box 111 to step 112, and packs all pending LSAs, as well as an unacknowledged node list, into a new packet. The new LSA packet is sent by broadcast communication (step 114). Other pending re-flood timers are deleted (step 116) and decision box 120 is entered.

If any of the LSAs in the transmitted packet are not marked RELIABLE, the method exits in step 121. If an LSA is marked RELIABLE, however, but all the LSAs are LOCAL and have a TTL of 1 (one-hop away) the method also exits, as determined by decision box 122. If the LSAs are not LOCAL (but GLOBAL) and have a TTL not equal to 1, the method branches to decision box 117.

In decision box 117, the method determines if it has any FGMs. If it does, the method sets an acknowledge timeout timer (indexed by an appropriate urgency level) (step 118), associates its unacknowledged FGMs to the timer (step 119), and branches to decision box 123.

After determining whether the FP has any FGMs, the method enters decision box 123 and determines Whether it (the FP) has any FP neighbors. If it does, the method sets the re-flood timeout timer (based on an appropriate urgency level) (step 124), associates its unacknowledged FP neighbors to the timer (step 125), and branches to entry point 4 (FIG. 12).

Figure 12:
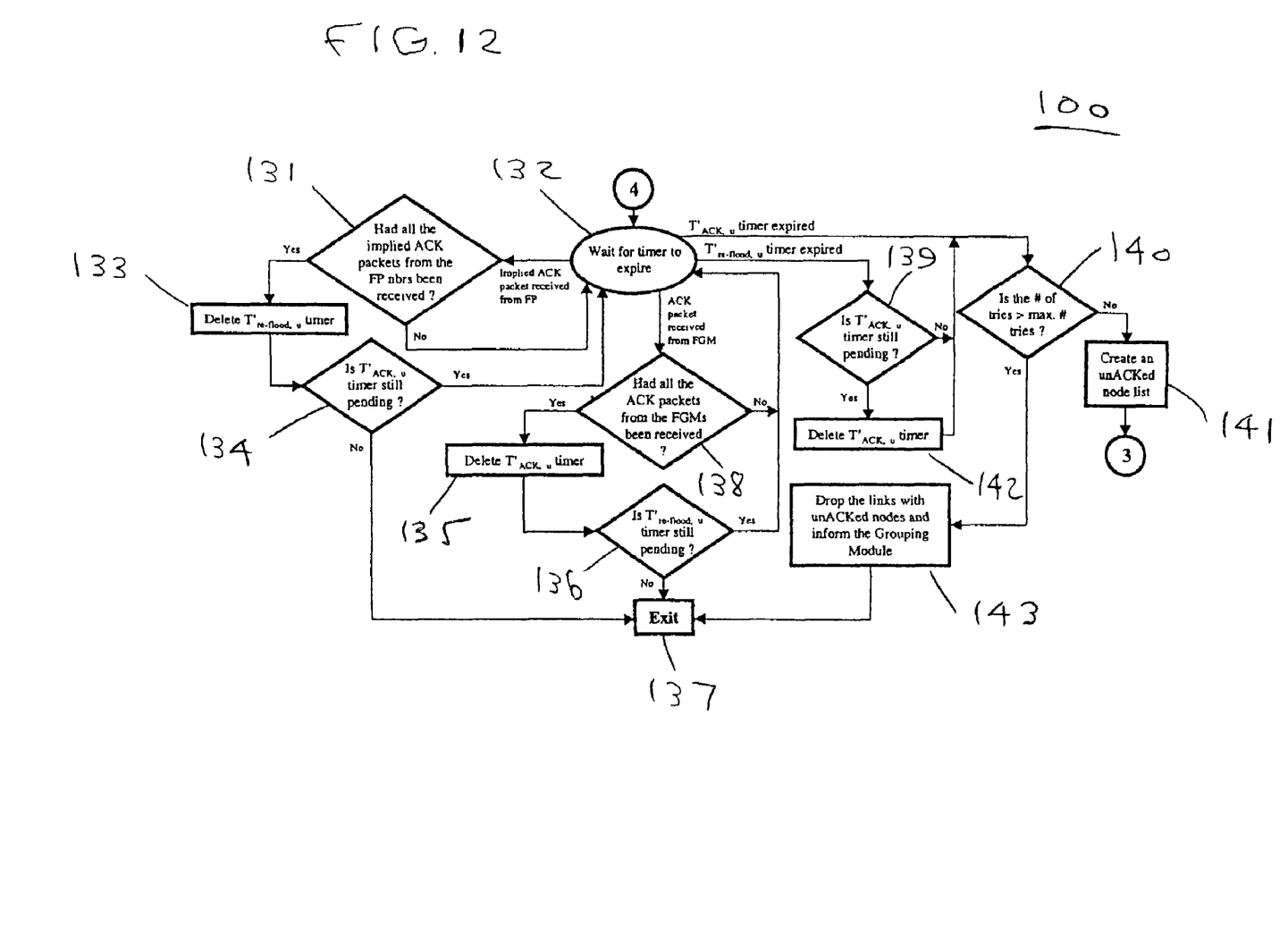

Referring now to FIG. 12, method 100 waits for the timers to expire (step 132). Describing first the right side of FIG. 12, after the re-flood timeout timer expires, the method enters decision box 139. If the acknowledge timeout timer is still pending, the method deletes (cancels) the acknowledge timeout timer (step 142) and enters decision box 140. After the acknowledge timeout timer expires, the method also enters decision box 140. If the FP has reached a predetermined number of tries (for example, 5) in attempting to receive an acknowledgment from another node, the method enters step 143 and drops the links with the unacknowledging nodes, informs its grouping module (FIG. 13), and exits in step 137. If the number of tries have not yet reached a predetermined maximum number, on the, other hand, the method enters step 141, creates an unacknowledging node list, and again attempts another transmission (point-to-point or broadcast) by entering step 111 (entry point 3 of FIG. 11).

Returning to step 132, if the aforementioned timeout timers have not expired and an acknowledgement packet is received from an FGM, the method branches to decision box 138 and waits for all the acknowledgement packets to be received from all its FGMs. After all the acknowledgement packets have been received, the method branches to step 135 and deletes the acknowledge timeout timer (step 135. If the re-flood timeout timer is still pending (has not expired), as determined by decision box 136, the method waits for the timer to expire by branching back to step 132. After expiration of the re-flood timeout timer, the method enters step 137 and exits.

In a similar manner, if all implied acknowledgement packets are received from the FP neighbors, prier to timeout, as determined by decision box 131, the method branches to step 133 and deletes the re-flood timeout timer. If the acknowledge timeout timer is still pending, as determined by decision box 134, the acknowledge timeout timer is deleted by looping back to steps 132 and 142. The method finally exits in step 137.

Figure 13:
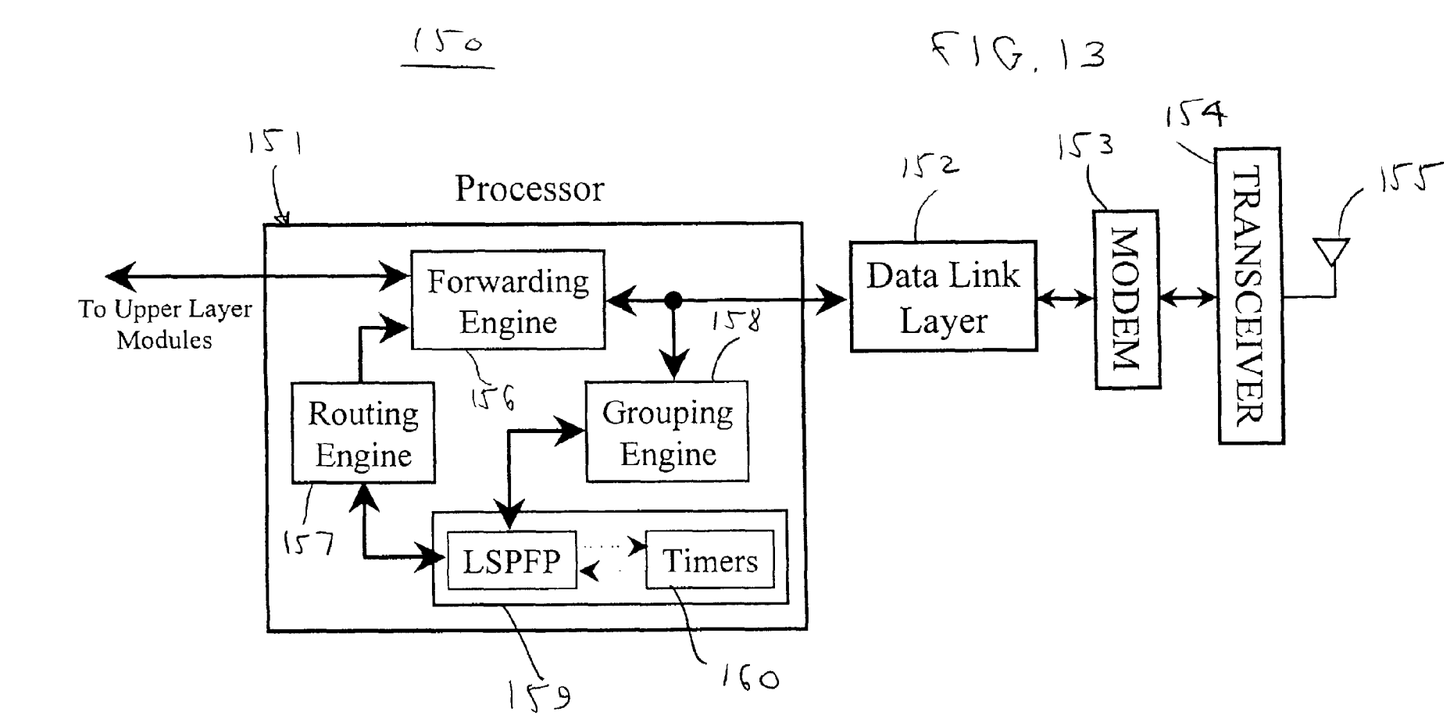
FIG. 13 is a block diagram of a node in the network of FIG. 1, in accordance with an embodiment of the invention.

A network node, generally designated as 150, according to the present invention, is illustrated in FIG. 13. As shown, node 150 includes processor 151, data link layer 152, modem 153, transceiver 154 and antenna 155. The processor is preferably implemented by a conventional microprocessor or controller and controls the node to transmit and receive messages in accordance with the communication methods and protocols described earlier. The transmitter portion of transceiver 154 is preferably implemented by a conventional transmitter and transmits messages from the processor, preferably in the form of radio frequency (RF) signals, in accordance with processor instructions. The receiver portion is typically implemented by a conventional receiver and configured to receive signals, preferably in the form of radio frequency (RF) signals, transmitted by the transmitter of another node. The receiver receives transmitted signals and forwards the received signals to the processor for processing. A present invention FP node is substantially similar to a FGM node.

Processor 151 includes forwarding engine 156, coupled between data link layer 152 and upper layer modules (not shown). Such upper layer modules may provide application software for appliances or computers invoking different protocols, for example, a point-to-point protocol (PPP) or an application program interface (API) protocol.

The link-state proxy flooding protocol (LSPFP), including the various methods of the invention, as previously described, is executed in LSPFP module 159 and is controlled by timer module 160. The timer module includes the multiple timers, each with its respective urgency level, as described previously. These timers may include the ACK timers, ACK timeout timers, re-flood timers and re-flood timeout timers.

Grouping engine 158 may group multiple LSAs into one packet for transmission. Routing engine 157 may control whether the processor is in a receive mode for receiving packets from transceiver 154 and then sending them to the upper layer modules, or whether the processor is in a transmit mode for transmitting packets arriving from the upper, layer modules.

It will be appreciated that the embodiments described above and illustrated in the drawings represent only a few of the many ways of implementing a method and apparatus for transmission of LSA packets throughout a network with reduced communication protocol overhead traffic.

The communication networks employing the present invention nodes may include any quantity of these nodes or tiers. The network nodes may be arranged in any fashion into any quantity of clusters or cells each having any quantity of nodes and head nodes. The backbone network may include any quantity of head nodes, while communications within a cluster and between neighboring cluster head nodes of the backbone network may utilize the same or different transmission frequencies. The formation of cells and designation of head nodes may be predetermined or accomplished dynamically via any conventional or other algorithm or technique. The nodes may communicate via any suitable communications medium (e.g., wired or wireless communication devices, etc.). The present invention node may include any quantity of conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals etc.). Alternatively, the present invention mode may include any quantity of combined transmitting/receiving devices.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of modules, processors or other processing devices or circuits. The software for the processor of the present invention node may be implemented in any suitable computer language, and could be developed by one of ordinary skill in the computer and/or programming arts based an the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate distribution of packets within the network in the manner described above.

The LSA packets or message (e.g., acknowledge, point-to-point message, broadcast message, etc.) may be of any size, may have any format, and may contain and desired information. The packets may be transmitted at any suitable transmission rate or have any desired interval between transmissions. The re-transmission timers may be implemented by any conventional or other timing mechanisms (e.g., processor clock, external hardware, software, etc.) and may be set to any desired intervals for re-transmission of any packets. The timers may be associated with any types of packets to indicate re-transmission of those packets. The member nodes may communicate a database update, acknowledgment or other type of packet to a cluster head node via any type of message. Further, the various messages may include any identifier to identify the type of message or packet. The database update or other packets may be broadcast or transmitted any quantity of times to achieve a desired success rate, where the repeated packets may be disposed within the same or different node status packets in any desired combination or fashion.

The communication network may employ any suitable intranet and/or internetworking communications protocols to facilitate reception, processing and transference of messages or packets within or external of the network. The present invention may be utilized within any intranet, internetworking or other protocol to transmit or flood messages within the network in accordance with the protocol. The insertion of the database update packets within the LSA packet may be accomplished within any layer of the intranet or other protocol. The node database may be implemented by any conventional database or other storage structure (e.g., processor memory, external memory, file, data structure (e.g., array, queue, stack, etc.), etc.) and may have any desired storage capacity to contain any desired information.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of disseminating information in a communication network including a plurality of nodes, the method comprising the steps of:
   (a) receiving, in a node, a packet including link-state advertisements (LSAs) from the communication network, at least one LSA including a flooding status field;
   (b) determining, in the node, a type of LSA received based on the flooding status field; and
   (c) re-flooding the packet, from the node, onto the communication network, based on the type of LSA determined in step (b);
   wherein the node includes a re-flood timer, and
   step (c) includes waiting a first interval of time for the re-flood timer to expire, and re-flooding the packet, from the node, onto the communication network after waiting the first interval of time for the re-flood timer to expire; and step (a) includes receiving a sub-field in the flooding status field indicating an urgency level for the at least one LSA, and step (c) includes setting, by the node, the re-flood timer to expire after a second interval of time based on the indicated urgency level, and waiting, by the node, for the re-flood timer to expire after the second interval of time, and then re-flooding the packet from the node onto the communication network, the second interval of time being different from the first interval of time.

2. The method of claim 1 wherein step (a) includes receiving a bit in the flooding status field indicating the at least one LSA is intended for distribution to the entire communication network, and step (c) includes re-flooding, from the node, the at least one LSA onto the communication network in response to the bit in the flooding status field.

3. The method of claim 1 wherein step (a) includes receiving a bit in the flooding status field indicating the at least one LSA is intended for distribution to other nodes in the communication network located within a predetermined range of the node, and step (c) includes preventing re-flooding of the at least one LSA, from the node, if the other nodes in the communication network are located outside of the predetermined range.

4. The method of claim 3 wherein step (a) includes receiving a sub-field in the flooding status field indicating a time-to-live (TTL) value, and step (c) includes re-flooding the at least one LSA, from the node, onto the communication network, if the received TTL value is greater than a value of one, and preventing re-flooding of the at least one LSA if the received TTL value is equal to a value of zero.

5. The method of claim 4 wherein the node receiving the at least one LSA is a flooding proxy node, and the other nodes of the communication network include at least one flooding group member node and another flooding proxy node.

6. The method of claim 1 in which the node includes an acknowledge timeout timer, and the following additional steps:

(d) setting an interval of time for the acknowledge timeout timer to expire based on an urgency level for the at least one LSA;

(e) waiting the interval of time for reception of an acknowledgement packet from another node in the communication network, after re-flooding the packet in step (c); and (f) again re-flooding the packet, from the node, onto the communication network, if the acknowledgement packet from the other node is not received during the interval of time.

7. The method of claim 1 wherein the urgency level includes a value indicating that the at least one LSA requires an interval of time sufficient for processing the at least one LSA, the value effective in slowing re-flooding of the at least one LSA in the network.

8. In a node disseminating information by transmitting link state advertisements (LSAs) to other nodes in a network, the node comprising a transmitter for transmitting LSAs to other nodes in the network, a processor for assembling at least one LSA and providing the LSA to the transmitter for transmission onto the network, and the processor including an engine for generating a flooding status field in the at least one LSA, the flooding status field including an urgency level having a value indicating that the at least one LSA requires an interval of time sufficient for processing the at least one LSA, the value effective in slowing re-flooding of the at least one LSA in the network.

9. The node of claim 8 wherein the flooding status field includes a reliable flooding flag indicating an acknowledgment is required by another node after the LSA is transmitted onto the network, and a normal flooding flag indicating that an acknowledgement is not required by the other node after the LSA is transmitted onto the network.

10. The node of claim 9 further including an acknowledgement timeout timer coupled to the engine for measuring an interval of time, and a receiver coupled to the processor for receiving acknowledgement packets from other nodes in the network in response to the at least one LSA transmitted by the transmitter, wherein after the interval of time expires in the acknowledgement timeout timer and an acknowledgement packet is not received in the receiver, the engine assembles another LSA for re-transmission onto the network.

11. The node of claim 10 in which the node is a flooding proxy node of a first cluster of nodes in the network, and the other nodes are at least one flooding group member node of the first cluster of nodes, and at least one flooding proxy node of a second cluster of nodes in the network.

12. The node of claim 8 wherein a TTL value is received from another external node, and the processor reduces the TTL value by a value of one, and if the TTL value is less than the value of one, after having reduced the TTL value, the processor prevents the LSA from being provided to the transmitter for transmission onto the network.

13. The node of claim 8 wherein the processor sets a TTL value to any hop-count value corresponding to a desired range the LSA is to be flooded, if the node originates the LSA, and the hop-count value set by the originating node is permitted to be different from another hop-count value set by another originating node in the network.

* * * * *